United States Patent [19]

Srock

[11] 3,951,451

[45] Apr. 20, 1976

[54] SHELL SEAT FOR PASSENGER MOTOR VEHICLES

[75] Inventor: Rainer Srock, Leinfelden, Germany

[73] Assignee: Dr. -Ing. h.c.F. Porsche Aktiengesellschaft, Germany

[22] Filed: July 19, 1973

[21] Appl. No.: 380,556

[30] Foreign Application Priority Data
July 21, 1972 Germany............................ 2235823

[52] U.S. Cl................................. 297/366; 297/457
[51] Int. Cl.².......................................... B60N 1/02
[58] Field of Search ...... 297/366, 372, 457, DIG. 2, 297/353, 354, 454

[56] References Cited
UNITED STATES PATENTS

| | | | |
|---|---|---|---|
| 2,198,532 | 4/1940 | Gieleghem | 297/344 R |
| 2,530,924 | 11/1950 | Turner | 297/457 |
| 2,646,839 | 7/1953 | Hillman | 297/344 X |
| 2,745,468 | 5/1956 | Kramer | 297/457 X |
| 3,123,396 | 3/1964 | Searle | 297/367 X |
| 3,669,496 | 6/1972 | Chisholm | 297/457 |

Primary Examiner—Paul R. Gilliam
Assistant Examiner—David H. Corbin
Attorney, Agent, or Firm—Craig & Antonelli

[57] ABSTRACT

A molded seat for passenger motor vehicles made, for example, of synthetic resinous material which has a seat area and a backrest part adjustable by means of an adjusting device; the adjusting device thereby includes a locking member fixing the backrest part in the preselected position and a further means stressing the backrest part in the driving direction toward the seat area; this further means may be constituted by predetermined profilings in the end wall of the seat within the transitional area between seat area and backrest or by rubber-like springs cooperating with fittings secured to the side walls of the seat area and backrest.

5 Claims, 9 Drawing Figures

SHELL SEAT FOR PASSENGER MOTOR VEHICLES

The present invention relates to a shell seat for passenger motor vehicles with a seating area and a backrest part, which is adjustable by means of an installation.

A shell seat is described in the prior art (German Offenlegungsschrift No. 1,755,333), in which the end wall is constructed within the transitional area between the seat area and the backrest part in the manner of a so-called film-joint-hinge, and whose backrest part is adjusted in both directions toward the front and toward the rear by means of a threaded spindle and bearing elements connected therewith. This type of construction, however, entails considerable disadvantages. Thus, insofar as the seating area and the backrest part are not connected with each other by way of a pivot bearing, the transitional area will yield in the presence of a force action on the backrest part and the backrest part will deflect out of its adjusted position. If the backrest part is connected with the seat area by way of a pivot bearing, then a stressing thereof together with the bearing elements takes place during the adjustment of the backrest part by means of the threaded spindle because the angular movement of the backrest part cannot be compensated for either by the threaded spindle or by the bearing elements. Additionally, the adjustment of the backrest by means of a threaded spindle causes a large number of revolutions which disadvantageously impair the manipulation of this adjusting member.

The aim which underlies the present invention, essentially consists in creating a shell seat which includes a simple and operationally correct installation for the adjustment of the backrest part.

This is achieved according to the present invention in that the installation includes a locking member fixing the backrest part and an arrangement stressing the backrest in the driving direction toward the seat area. It is thereby of advantage if the seat area and the backrest part are made in one piece and if the lateral walls thereof are interrupted up to an end wall within the transitional area between the seat area and the backrest part whereby the arrangement is provided at the end wall within the transition area. The arrangement is constituted by profilings provided at the end wall. These profilings are provided section-wise over the width of the end wall and are constituted by beads or stiffening corrugations which extend approximately vertically. The beads or stiffening corrugations are interrupted in the approximately vertically extending direction and terminate in the profiled configuration of the end wall. However, it is also possible that the profilings are constituted by cross-sectional enlargements. Additionally, according to a further embodiment of the present invention, the arrangement is represented by a rubber spring which cooperates with fittings provided at the side walls of the seat area of the backrest part.

The advantages primarily achieved by the present invention reside in that for purposes of the adjustment of the backrest the driver only has to disengage the locking member and then is able to adjust a desired inclination either by the tensional force of the arrangement or against the same and is able to fix the same by means of the locking member. A simple shell seat which can be readily manufactured is created by the unitary, one-piece manufacture of the seat area and of the backrest part and by the provision of the arrangement at the end wall in the transition area. The profilings which can be constituted by beads or cross-sectional enlargements assure that the arrangement is not only constructed in a simple manner but that it also exerts with a corresponding configuration a sufficient force in the vehicle longitudinal direction toward the seat area.

These and further objects, features and advantages of the present invention will become more apparent from the following description when taken in connection with the accompanying drawing which shows, for purposes of illustration only, several embodiments in accordance with the present invention, and wherein.

Figure 1:
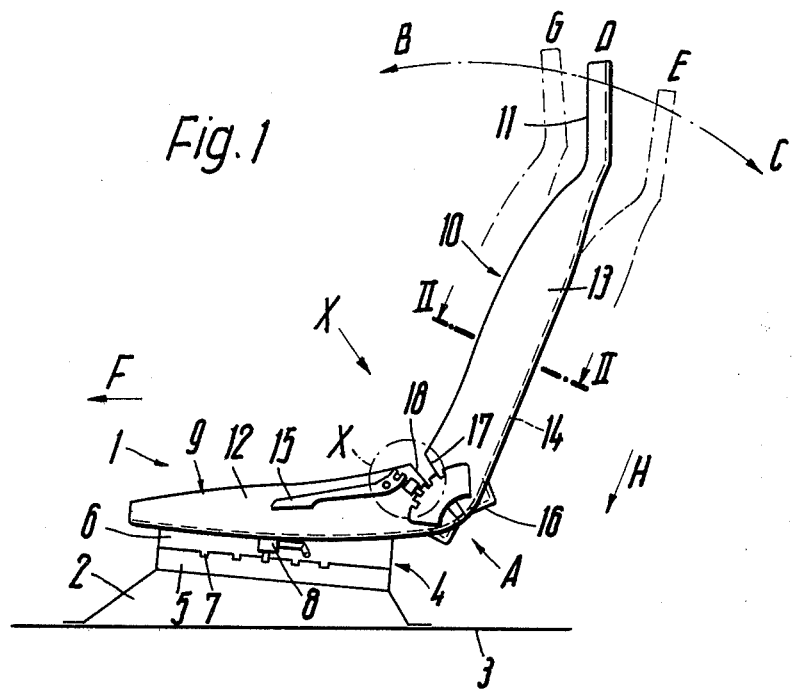
FIG. 1 is a side elevational view of a shell seat with an installation according to the present invention.

Referring now to the drawing wherein like reference numerals are used throughout the various views to designate like parts, and more particularly to FIG. 1, the shell seat generally designated by reference numeral 1 is arranged on a seat bracket 2 of a floor installation 3 of a motor vehicle, not further illustrated in details, by means of a seat-adjusting device generally designated by reference numeral 4. The seat-adjusting device 4 includes a relatively fixed part 5 secured at the seat bracket 2, with which cooperates a part 6 displaceable in the vehicle longitudinal direction which is connected with the shell seat 1. For purposes of displacing the shell seat 1, detents 7 and an adjustable locking device 8 cooperating therewith are provided which are illustrated only schematically since they are known as such in the art.

Figure 2:
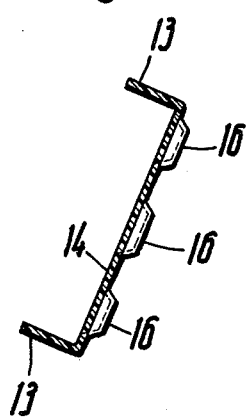
FIG. 2 is a cross-sectional view taken along line II—II of FIG. 1.

The shell seat 1 is made of suitable synthetic resinous material and includes a seat area generally designated by reference numeral 9 and a backrest part generally designated by reference numeral 10 having a headrest 11. The backrest part 10 and the seat area 9 are integrally connected with each other in one piece and include side walls 12 and 13 (FIG. 2). The side walls 12 and 13 are interrupted in the circularly shaped transitional area A between the seat area 9 and the backrest part 10 and more particularly up to an end wall 14 of the shell seat 1.

The backrest part 10 is thereby constructed adjustable in the vehicle longitudinal direction B-C. To that end a locking member 15 and a device 16 are provided. The locking member 15 fixes the backrest part 10, for example, in the positions D and E. The device 16 which exerts a force in the driving direction F, stresses the backrest part 10 toward the seat area 9 whereby the backrest part 10 in the prefabricated condition, i.e., without the locking member 15 assumes the position G and with one surface 17 of the side wall 13 abuts at a surface 18 of the side wall 12.

The device 16 is constituted by profilings which are provided in the end wall 14 within the transition area A. These profilings are provided at intervals over the width of the end wall 14 of the backrest part 10 (FIG. 2) and are represented by beads or stiffening corrugations 17' (FIG. 3) which are directed approximately perpendicularly (direction H) with respect to the floor installation 3 (FIG. 1).

Figure 3:
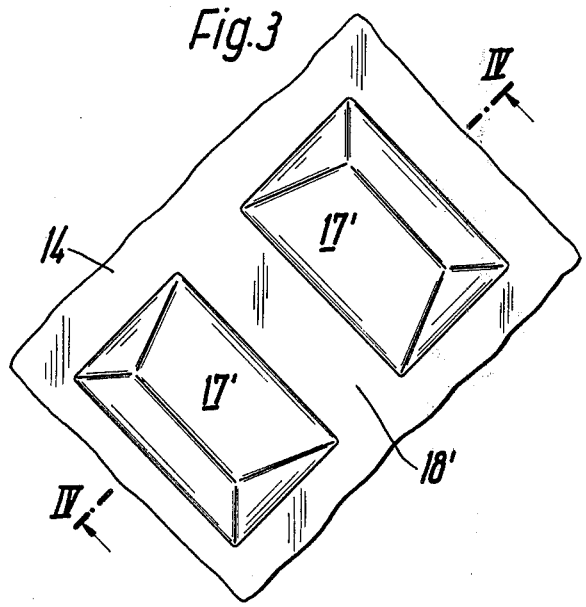
FIG. 3 is a partial plan view, on an enlarged scale, taken in the direction of arrow X of FIG. 1.
Figure 4:
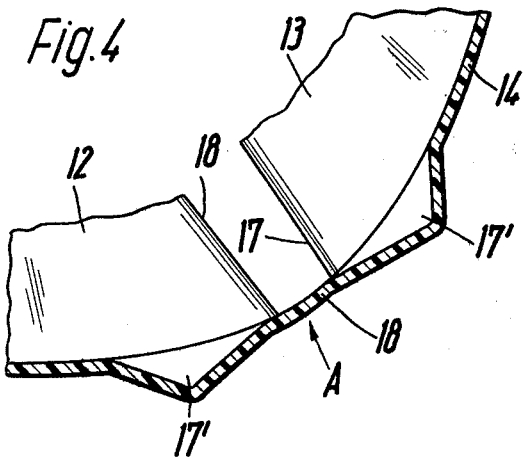
FIG. 4 is a cross-sectional view taken along line IV—IV of FIG. 3.

According to FIGS. 3 and 4, the beads or stiffening corrugations 17' are interrupted at 18' and terminate in the configuration of the shape of the end wall 14. The pivot point of the backrest part 10 is thereby far-reachingly determined.

Figure 5:
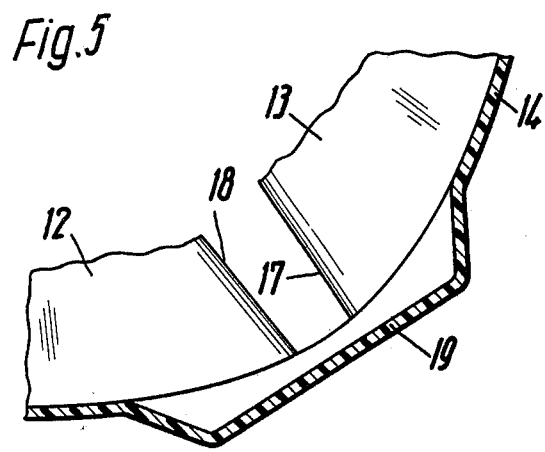
FIG. 5 is a cross-sectional view, similar to FIG. 4, of a further embodiment according to the present invention.

In FIG. 5, the bead or stiffening corrugation 19 is constructed continuously in the end wall 14 whereby high forces of the backrest part in the driving direction F can be achieved.

Figure 6:
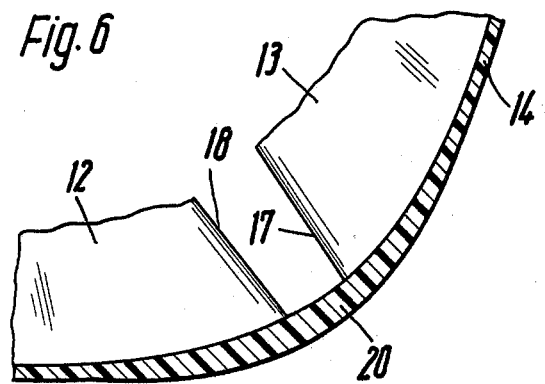
FIG. 6 is a partial cross-sectional view, similar to FIG. 4, of a still further modified embodiment in accordance with the present invention.

According to FIG. 6, the end wall 14, instead of being provided with a stiffening corrugation, is provided with a cross-sectional enlargement 20 which has a shaped configuration increasing and decreasing from the top toward the bottom.

Figure 7:
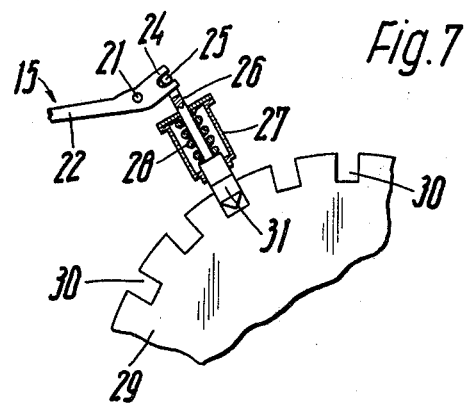
FIG. 7 is a partial side elevational view illustrating, on an enlarged scale, the details of the parts encircled by X in FIG. 1.

The locking member 15 (FIG. 7) includes a hand lever 22 pivotally supported at 21, which includes a fork-shaped end section 24. The end section 24 cooperates by way of a part 25 with a pin 26 which is supported in a housing 27 and engages in a detent member 29 by the action of a spring 28. The detent member 29 is provided with rectangular recesses or apertures 30 and the pin 26 has a section 31 corresponding thereto. As a result thereof one counteracts in both longitudinal directions B and C an undesired disengagement of the pin 26 with forces engaging at the backrest part 10.

Figure 8:
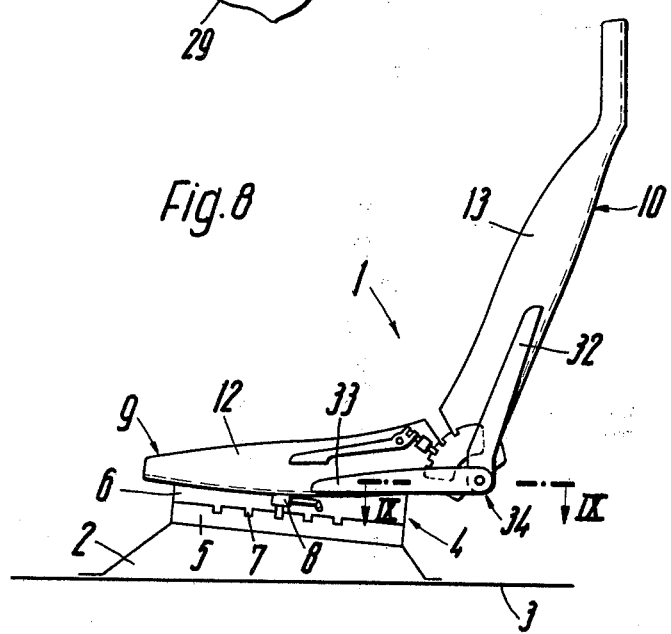
FIG. 8 is a side elevational view, similar to FIG. 1, of a modified embodiment in accordance with the present invention.
Figure 9:
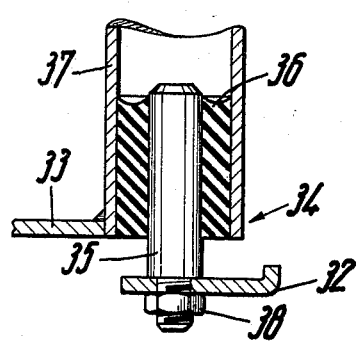
FIG. 9 is a partial cross-sectional view, on an enlarged scale, taken along line IX—IX of FIG. 8.

A further possibility of an installation according to the present invention is illustrated in FIGS. 8 and 9. According to this embodiment, the side walls 12 and 13 of the backrest part 10 and of the seat area 9 are provided with fittings 32 and 33. A rubber spring 34 cooperates with the fittings 32 and 33 which seeks to rotate the backrest part 10 in the driving direction F. The rubber spring 34 includes a pivot pin 35, a rubber mass 36 and a tubular member 37. The tubular member 37 and the pivot pin 35 are securely bonded with the rubber mass 36, for example, by a material connection realized, e.g., by vulcanizing the rubber mass 36 to the respective metal parts. The fitting 32 is retained at the pivot pin 35 by a threaded element 38. The tubular member 37 is connected with the fitting 33 by welding or the like.

Insofar as the driver desires an adjustment of the backrest 10, for example, into the position E (FIG. 1), he disengages the pin 26 by means of the hand lever 22 out of the detent member 29. Thereafter, he forces the backrest part 10 into the position E against the tensional force of the device 16 and engages the pin 26 again into the detent member 29.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A shell seat for passenger motor vehicles, the shell seat comprising: a lower seat means including a main body supporting portion and a pair of integrally formed outwardly projecting side wall portions, said main body supporting portion and said integrally formed side wall portions defining a lower seat area having a substantially U-shaped configuration, an adjustable back rest means including a main body supporting portion and a pair of integrally formed outwardly projecting side wall portions disposed in substantial alignment with the side wall portions of said lower seat means, said main body supporting portion of said adjustable back rest means and said side wall portions thereof defining a back rest area having a substantially U-shaped cross-sectional configuration, a connecting wall portion disposed in a transistional area between the lower seat means and the back rest means for connecting said main body portions of said lower seat means with said adjustable back rest means, said connecting wall portion being integrally formed with said main body portions of said lower seat means and said adjustable back rest means such that the shell seat is made in one piece, said side wall portions of said lower seat means and said adjustable back rest means being interrupted up to the connecting wall portion at the transistional area between the lower seat means and the adjustable back rest means, means for adjusting the adjustable back rest means including a means for locking said adjustable back rest means in an adjusted position, and means provided on the connecting wall portion at the transistional area between the lower seat means and the adjustable back rest means for stressing the back rest means in the driving direction of the motor vehicle toward said lower seat means, said means for stressing being constituted by profile means provided at the connecting wall portion, said profile means being constituted by stiffening corrugations which extend in an approximately vertical direction.

2. A shell seat for passenger motor vehicles according to claim 1, characterized in that said stiffening corrugations are interrupted in the approximately vertical direction and terminate in the configuration of said connecting wall portion.

3. A shell seat for passenger motor vehicles according to claim 2, characterized in that the stiffening corrugations are provided in sections over the width of said connecting wall portion.

4. A shell seat for passenger motor vehicles, the shell seat comprising: a lower seat means including a main body supporting portion and a pair of integrally formed outwardly projecting side wall portions, said main body supporting portion and said integrally formed side wall portions defining a lower seat area having a substantially U-shaped configuration, an adjustable back rest means including a main body supporting portion and a pair of integrally formed outwardly projecting side wall portions disposed in substantial alignment with the side wall portions of said lower seat means, said main body supporting portion of said adjustable back rest means and said side wall portions thereof defining a back rest area having a substantially U-shaped cross-sectional configuration, a connecting wall portion disposed in a transistional area between the lower seat means and the back rest means for connecting said main body portions of said lower seat means with said adjustable back rest means, said connecting wall portion being integrally formed with said main body portions of said lower seat means and said adjustable back rest means such that the shell seat is made in one piece, said side wall portions of said lower seat means and said adjustable back rest means being interrupted up to the connecting wall portion at the transistional area between the lower seat means and the adjustable back rest means, means for adjusting the adjustable back rest means including a means for locking said adjustable back rest means in an adjusted position, and means provided on the connecting wall portion at the transistional area between the lower seat means and the adjustable back rest means for stressing the back rest means in the driving direction of the motor vehicle toward said lower seat means, said means for stressing being constituted by profile means provided at the connecting wall portion, said profile means being constituted by cross-sectional enlargements.

5. A shell seat for passenger motor vehicles according to claim 4, wherein said cross-sectional enlargements are provided in sections over the width of the connecting wall portion.

\* \* \* \* \*